United States Patent Office 2,763,645
Patented Sept. 18, 1956

---

2,763,645

AMINO ALCOHOL ESTERS OF ETIOCHOLENE 17α HYDROXY 3 ONE 17β CARBOXYLIC ACID

Barry M. Bloom, Jackson Heights, N. Y., assignor to Chas. Pfizer & Co., Inc., Brooklyn, N. Y., a corporation of Delaware No Drawing. Application January 28, 1955,
Serial No. 484,829

4 Claims. (Cl. 260—239.5)

This invention is concerned with certain amino alkanol esters of steroid carboxylic acids. In particular, it is concerned with amino alkanol esters of etiocholene-17α-ol-3-one-17β-carboxylic acid, and with certain derivatives of this acid. It has been found that these compounds are potent coronary vasodilators.

Various compounds have been suggested as vasodilators. These are useful in the treatment of such conditions as angina pectoris and coronary thrombosis, as well as other conditions of the heart. It has now been found that certain amino alkanol esters of etiocholene-17α-ol-3-one-17β-carboxylic acid and related compounds are particularly effective as coronary vasodilators. Particularly notable is the selectivity of the vasodilation of the novel compounds which show high coronary action and a low order peripheral action.

The compounds of the present invention are prepared with relative ease from the corresponding carboxylic acids and the desired amino alkanol or from a suitable related compound such as a halide of the amino alkane. The preferred steroid carboxylic acids may be prepared by the oxidation of certain readily available substances, such as compound S (11-desoxy-17-hydroxycorticosterone), which, on oxidation with periodic acid, yields the desired carboxylic acid. This process is described in detail by Reichstein et al. in Helv. Chim. Acta, vol. 22, p. 1107 (1949). Various related compounds may be made in the same way from known substances. Thus, the compound substituted at the 11-position with an hydroxyl may also be prepared in an analogous manner.

The novel compounds of the present invention may be illustrated by the following structural formula:

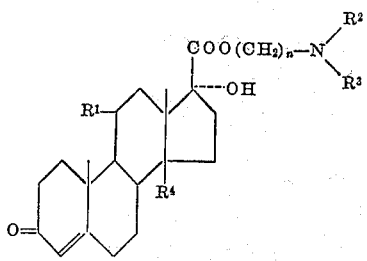

wheerin R¹ is hydrogen, hydroxyl, or keto, n is an integer from 2 to 4,

is an amino radical selected from the group consisting of di (lower alkyl) amino radicals and radicals wherein R² and R³ are joined to form a mono cyclic saturated heterocyclic amino radical, and R⁴ is hydrogen or hydroxyl. By "lower alkyl" is meant a straight or branched group with one to four carbons, e. g. methyl, ethyl, propyl, isopropyl, isobutyl, etc. By "mono cyclic saturated heterocyclic amino radical" is meant such groups as piperidino, tetrahydropyrimidino, morpholino, imidazolidino, pyrrolidino, etc. An example of a compound of the present invention in which the basic nitrogen of the alkanol-amine side chain is involved in a ring system (piperidine) is the following:

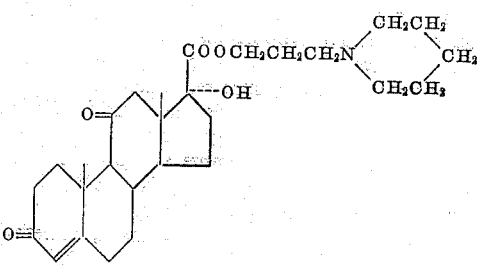

This is the γ-piperidino propanol ester of etiocholene-17α-ol-3,11-dione-17β-carboxylic acid.

As noted above, the compounds of the present invention may be prepared from the chosen steroid acid and a compound furnishing a group having the structure

such as the chosen amino alcohol or other source of an amino alkyl group. It is frequently convenient to utilize an inert solvent in conducting the reaction. Various ethers (e. g. diethyl ether, dipropyl ether tetrahydrofurane, etc.) are useful for this purpose as well as hydrocarbons (e. g. benzene, toluene, xylene, etc.), halogenated hydrocarbons (e. g. chloroform, methylene chloride, trichlorethylene, etc.), or alkanols, such as methanol, ethanol, isopropanol, butanol, and so forth. It is usually necessary to conduct the reaction for the preparation of the esters at an elevated temperature, that is, from about 35° C. to the boiling point of the solvent, in order to obtain appreciable yields of the desired esters. A further method that may be utilized for the preparation of the desired esters is the transesterification method in which the di-substituted amino alkanol in the form of an ester with a lower organic acid such as acetic acid or propionic acid is heated with a lower alkanol ester of the desired steroid carboxylic acid. A variety of substituted amino alkanols are available commercially as are the amino alkyl halides. These may be utilized for the preparation of esters of the present invention. A further method of value entails conversion of the acid to an acid halide by conventional methods which are not destructive of the steroid acid. The acid halide is reacted with the chosen substituted amino alkanol. This reaction may be conducted in a liquid tertiary organic base, e. g. dimethylaniline, pyridine, quinoline, etc.

Since the esters of the present invention are of very limited solubility in water, it is desirable to prepare these compounds in the form of salts, such as salts with lower aliphatic acids, hydroxy organic acids, or with inorganic acids. Such compounds as the acetates, propionates, citrates, tartrates, malates, hydrobromides, phosphates, hydrochlorides, sulfates, hydriodides, are of particular value for this purpose.

In the use of the esters of the present invention in the form of their salts, these materials are prepared in sterile, aqueous solution, in saline solution, or in glucose solution, or in a mixture of saline and glucose solution. The materials may then be administered by the intravenous route in a suitable dosage depending upon the size of the patient to be treated and to the extent to which dilation of the heart is required. The esters of the present invention are white, solid materials often obtained in crystalline form. They may be isolated from the reaction mixture in which they are formed by removing the solvent and excess reactants. Unreacted acid may be extracted from solutions of the product in water-immiscible liquids, by dilute, aqueous alkali. Care must be observed not to hydrolyze the ester. The solvent may then be removed from the solution of the ester and any excess dialkyl amino alkanol, dialkyl amino alkyl halide or other reactant may be removed by distillation. In general, in conducting the reaction, approximately molecular proportions of the two reactants are used. The reaction mixture may be heated for a period of several hours to assure reasonably complete reaction. In some cases, it is advisable to utilize an inert atmosphere, for example, a nitrogen atmosphere, in order to avoid decomposition of reactants and product.

Among the substituted amino alkanols or alkyl halides that may be utilized for the present purpose are the following compounds—dimethylamino ethanol, dimethylaminoethyl bromide, diethylamino ethanol, diethylaminoethyl chloride, dipropylamino ethanol, dipropylaminoethyl chloride, dibutylamino propanol, dibutylaminoethyl chloride, piperidinoethyl chloride, piperidinobutyl bromide, pyrrolidinoethyl bromide, pyrrolidinobutyl bromide, pyrrolidino-propanol, β-hydroxyethyl-tetrahydropyrimidine, γ-hydroxypropyl-tetrahydro-imidazole, and so forth. In addition to etiocholene-17α-ol-3-one-17β-carboxylic acid, there may be used etiocholene-11β,17α-diol-3-one-17β-carboxylic acid and etiocholene-17α-ol-3,11-dione-17β-carboxylic acid, etiocholene-14,17α-diol-3-one-17β-carboxylic acid, and so forth.

The following examples are given by way of illustration and are not to be regarded as limitations of this invention, many variations of which are possible without departing from the spirit and scope thereof.

*Example I*

2.88 grams of β-diethylaminoethyl chloride hydrochloride was dissolved in 4 mls. of water. This mixture was treated with 15 mls. of saturated potassium carbonate solution at a temperature of 0° C. The solution was then extracted with three 30-ml. portions of isopropanol. The isopropanol layers were combined and dried over solid anhydrous potassium carbonate. 2.0 grams of etiocholene-17α-ol-3-one-17β-carboxylic acid was added and the mixture was refluxed for 5 hours. It was then concentrated under vacuum to a white crystalline solid. The solid residue was taken up in 100 mls. of water and 40 mls. of 3-N hydrochloric acid were added. The solution, which contained some solid material, was extracted with a mixture of ether and methylene chloride. The organic layer was separated, dried over anhydrous sodium sulfate, and concentrated under vacuum to a colorless glass. This solid was triturated with a small volume of ether. A colorless crystalline solid was filtered. This proved to be unreacted steroid carboxylic acid. The aqueous acid layer was filtered to remove a small amount of insoluble material and it was then made alkaline with 80 mls. of 3-N ammonium hydroxide solution. A white precipitate was formed. This was extracted with five 50-ml. portions of diethyl ether. The organic layers were combined, washed with three small volumes of water and the ether solution was then dried over anhydrous sodium sulfate. The solvent was removed by distillation and a colorless crystalline product was obtained. This product weighed 790 mgs. It was washed with a small volume of ether on a funnel. The solid material was found to have a melting point of 68.0 to 70.2° C. This compound was identified as the β-diethylaminoethyl ester of etiocholene-17α-ol-3-one-17β-carboxylic acid.

The acetate of the above product was prepared by dissolving a small sample in a slight excess of glacial acetic acid. The clear solution was evaporated carefully under vacuum and the acetate was obtained as a solid crystalline product. The hydrobromide was prepared by dissolving a small amount of the ester in anhydrous ether. Anhydrous hydrogen bromide gas was passed over the surface of the solution while the latter was being stirred. Within two to four minutes, a white amorphous precipitate separated. The solution was decantered from the precipitated solid. The solid was taken up in methanol and the solution was treated with several volumes of anhydrous ether. After storing for two days under refrigeration, a small amount of precipitate had separated. The mixture was then concentrated almost to dryness, taken up in two mls. of ethanol, and treated with two milliliters of methylethyl ketone, then several volumes of ether were added. After standing in the refrigerator overnight, a white precipitate separated. This was filtered, washed with a small volume of ether and dried over phosphorus pentoxide. The hydrobromide had a melting point of 219.8 to 224.6° C. It was highly soluble in water at room temperature.

*Example II*

The dipropylaminobutyl ester of etiocholene-11β,17α-diol-3-one-17β-carboxylic acid was prepared in a manner analogous to that described in the first example above, by esterification of the appropriate carboxylic acid (prepared from compound F, by treatment with periodic acid) with dipropylbutyl bromide. The ester was obtained as a white solid mateiral, highly soluble in water as the hydrochloride, phosphate or tartrate.

*Example III*

The acid chloride of etiocholene-17α-ol-3,11-dione-17β-carboxylic acid was prepared by careful treatment of the acid with a slight excess of oxalyl chloride. The acid chloride in pyridine was treated with a molecular proportion of γ-piperidinopropanol. The mixture was allowed to stand at room temperature overnight. It was then poured into dilute cold aqueous hydrochloric acid. The solution was made slightly basic with sodium bicarbonate and the product was filtered. It was shown to be the α-piperidinopropanol ester of the steroid carboxylic acid.

What is claimed is:

1. A process for the preparation of a compound having the formula

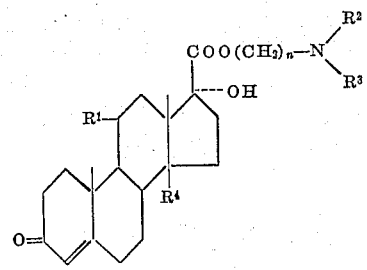

wherein $R^1$ is selected from the group consisting of hydrogen, hydroxyl and keto, $n$ is an integer from 2 to 4,

is an amino radical selected from the group consisting of di(lower alkyl) amino radicals and radicals wherein $R^2$ and $R^3$ are joined to form a monocyclic saturated heterocyclic amino radical selected from the class consisting of piperidino, tetrahydropyrimidino, morpholino, imidazolino and pyrrolidino groups, and $R^4$ is chosen from the group consisting of hydrogen and hydroxyl, which comprises esterifying a steroid carboxylic acid having the formula

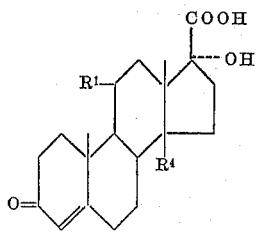

with a compound having the structure

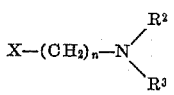

wherein X is selected from the class consisting of hydroxyl and halogen.

2. A process as claimed in claim 1 wherein the steroid carboxylic acid is etiocholene-17α-ol-3-one-17β-carboxylic acid.

3. A process as claimed in claim 1 wherein the steroid acid is etiocholene-11β,17α-diol-3-one-17β-carboxylic acid.

4. A compound having the structural formula

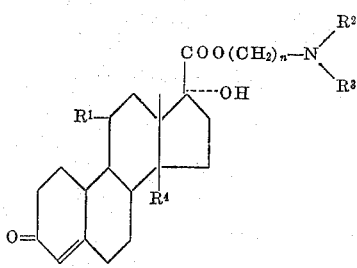

wherein $R^1$ is selected from the group consisting of hydrogen, hydroxyl, and keto, $n$ is an integer from 2 to 4, $$-N\begin{matrix}R^2\\R^3\end{matrix}$$

is an amino radical selected from the group consisting of di(lower alkyl) amino radicals and radicals wherein $R^2$ and $R^3$ are joined to form a monocyclic saturated heterocyclic amino radical selected from the class consisting of piperidino, tetrahydropyrimidino, morpholino, imidazolino and pyrrolidino groups, and $R^4$ is chosen from the group consisting of hydrogen and hydroxyl and the salts thereof.

No references cited.